United States Patent [19]
Pigott et al.

[11] Patent Number: 5,579,686
[45] Date of Patent: *Dec. 3, 1996

[54] PLASTIC PALLET ASSEMBLY

[75] Inventors: Brandon L. Pigott, Wilmette; Schuyler F. Pigott, Arlington Heights; Peter S. Pigott, Wilmette; Maurice J. Pigott, Winnetka, all of Ill.

[73] Assignee: Nucon Corporation, Deerfield, Ill.

[ * ] Notice: The term of this patent shall not extend beyond the expiration date of Pat. No. 5,343,814.

[21] Appl. No.: 351,894

[22] Filed: Dec. 8, 1994

Related U.S. Application Data

[63] Continuation-in-part of Ser. No. 24,050, Jun. 7, 1994, Pat. No. Des. 364,030, which is a continuation-in-part of Ser. No. 15,696, Nov. 24, 1993, Pat. No. Des. 354,606, which is a continuation-in-part of Ser. No. 12,508, Sep. 2, 1993, Pat. No. Des. 347,511, which is a continuation-in-part of Ser. No. 7,372, Apr. 21, 1993, Pat. No. Des. 346,681, which is a continuation-in-part of Ser. No. 961,396, Oct. 15, 1992, Pat. No. 5,343,814, which is a continuation-in-part of Ser. No. 644,928, Jan. 23, 1991, Pat. No. 5,197,395, which is a continuation-in-part of Ser. No. 230,025, Aug. 9, 1988, Pat. No. 4,843,976.

[51] Int. Cl.$^6$ ..................................................... B65D 19/12
[52] U.S. Cl. .......................................... 108/56.1; 108/902
[58] Field of Search ................................... 108/51.1, 901, 108/902, 56.1, 56.3

[56] References Cited

U.S. PATENT DOCUMENTS

| Re. 32,344 | 2/1987 | Wind . |
| D. 233,373 | 10/1974 | Rehrig . |
| D. 247,523 | 3/1978 | Carroll et al. . |
| D. 257,247 | 10/1980 | Powers . |
| D. 346,681 | 5/1994 | Pigott et al. . |
| D. 347,511 | 5/1994 | Pigott et al. . |
| 2,691,499 | 10/1954 | Watts . |
| 2,916,239 | 12/1959 | Stopps . |
| 2,918,241 | 12/1959 | Maher . |
| 2,991,965 | 7/1961 | Drieborg . |
| 3,123,020 | 3/1964 | Voissem . |
| 3,307,504 | 3/1967 | Cloyd et al. . |
| 3,316,861 | 5/1967 | Dailey . |
| 3,407,758 | 10/1968 | Simkins . |
| 3,424,110 | 1/1969 | Toot . |
| 3,438,342 | 4/1969 | Woolworth et al. . |
| 3,606,844 | 9/1971 | Lubker, II et al. . |
| 3,610,173 | 10/1971 | McIlwraith et al. . |
| 3,664,271 | 5/1972 | Wolder et al. . |

(List continued on next page.)

FOREIGN PATENT DOCUMENTS

| 23328/70 | 6/1972 | Australia . | |
| 42086/72 | 11/1973 | Australia . | |
| 0226505 | 6/1987 | European Pat. Off. . | |
| 2101346 | 3/1972 | France | 108/902 |
| 2160677 | 6/1973 | France . | |
| 2259023 | 8/1975 | France . | |
| 2274512 | 1/1976 | France . | |
| 2486029 | 1/1982 | France . | |
| 2564430 | 11/1985 | France . | |
| 2403374 | 8/1975 | Germany | 108/901 |
| 2613083 | 3/1976 | Germany . | |
| 2655593 | 6/1977 | Germany | 108/56.1 |
| 3806097 | 9/1989 | Germany . | |
| 59-191322 | 12/1984 | Japan . | |
| 59-186228 | 12/1984 | Japan . | |
| 1-130937 | 9/1989 | Japan . | |
| 1294435 | 11/1989 | Japan | 108/901 |
| 9002386 | 6/1991 | Netherlands . | |
| 88-6300 | 5/1988 | Rep. of Korea . | |
| 701869 | 12/1979 | U.S.S.R. . | |
| 166486 | 7/1921 | United Kingdom . | |
| 1310898 | 3/1973 | United Kingdom . | |
| 2224993 | 5/1990 | United Kingdom . | |
| 2252293 | 8/1992 | United Kingdom . | |
| 2280663 | 2/1995 | United Kingdom . | |

Primary Examiner—Jose V. Chen
Attorney, Agent, or Firm—Wallenstein & Wagner, Ltd

[57] ABSTRACT

A plastic pallet (10) is disclosed that includes a deck (100), a base (20), a plurality of separate connectors (11) and a plurality of internal connectors (11a).

22 Claims, 13 Drawing Sheets

U.S. PATENT DOCUMENTS

| | | | |
|---|---|---|---|
| 3,664,272 | 5/1972 | Sanders . | |
| 3,667,403 | 6/1972 | Angelbeck . | |
| 3,680,495 | 8/1972 | Pike . | |
| 3,683,821 | 8/1972 | Mangold . | |
| 3,685,461 | 8/1972 | Belcher | 108/901 X |
| 3,691,964 | 9/1972 | Larson et al. . | |
| 3,691,965 | 9/1972 | Cloyd . | |
| 3,717,396 | 2/1973 | Dupree . | |
| 3,804,032 | 4/1974 | Baucom . | |
| 3,814,031 | 6/1974 | Fowler . | |
| 3,835,791 | 9/1974 | Brown . | |
| 3,835,792 | 9/1974 | Wharton . | |
| 3,868,915 | 3/1975 | Hafner . | |
| 3,915,099 | 10/1975 | Wies et al. . | |
| 3,916,803 | 11/1975 | Garcia . | |
| 3,994,241 | 11/1976 | Evans . | |
| 4,002,126 | 1/1977 | Bell et al. . | |
| 4,013,021 | 3/1977 | Steinlein et al. . | |
| 4,051,787 | 10/1977 | Nishitani et al. | 108/901 X |
| 4,128,253 | 12/1978 | Powers | 108/56.1 X |
| 4,159,592 | 7/1979 | Gabriel . | |
| 4,183,491 | 1/1980 | Sanders et al. | 108/901 X |
| 4,230,049 | 10/1980 | Horne . | |
| 4,267,781 | 5/1981 | Powers . | |
| 4,287,836 | 9/1981 | Aoki . | |
| 4,316,419 | 2/1982 | Cupido . | |
| 4,430,776 | 2/1984 | Shumizu et al. . | |
| 4,475,703 | 10/1984 | Nordgren . | |
| 4,482,051 | 11/1984 | Cantey, Jr. . | |
| 4,580,680 | 4/1986 | Wind . | |
| 4,597,338 | 7/1986 | Kreeger | 108/902 X |
| 4,604,014 | 8/1986 | Frano . | |
| 4,635,562 | 1/1987 | Kreeger . | |
| 4,664,260 | 5/1987 | Stokes . | |
| 4,671,188 | 6/1987 | Betro . | |
| 4,674,910 | 6/1987 | Hayashi . | |
| 4,681,288 | 7/1987 | Nakamura . | |
| 4,697,699 | 10/1987 | Schneider . | |
| 4,706,576 | 11/1987 | James . | |
| 4,735,154 | 4/1988 | Hemery . | |
| 4,782,763 | 11/1988 | Salloum . | |
| 4,786,225 | 11/1988 | Poe et al. . | |
| 4,799,433 | 1/1989 | Luft . | |
| 4,843,976 | 7/1989 | Pigott et al. | 108/901 X |
| 4,869,456 | 9/1989 | Jacobs . | |
| 4,879,956 | 11/1989 | Shuert . | |
| 4,928,827 | 5/1990 | Hara . | |
| 4,951,821 | 8/1990 | Kempkes . | |
| 4,972,782 | 11/1990 | Shepherd et al. . | |
| 4,998,619 | 3/1991 | Sowa et al. . | |
| 5,007,352 | 4/1991 | Calkoen . | |
| 5,094,175 | 3/1992 | Christie . | |
| 5,097,951 | 3/1992 | Pigott et al. . | |
| 5,160,029 | 11/1992 | Pigott et al. . | |
| 5,178,075 | 1/1993 | Kanazawa . | |
| 5,193,464 | 3/1993 | Morden . | |
| 5,197,395 | 3/1993 | Pigott et al. | 108/902 X |
| 5,197,396 | 3/1993 | Breezer et al. . | |
| 5,343,814 | 9/1994 | Pigott et al. | 108/901 X |

PLASTIC PALLET ASSEMBLY

REFERENCE TO RELATED APPLICATION

This is a Continuation-In-Part application of U.S. Ser. No. 29/024,050, filed Jun. 7, 1994 for a PLASTIC PALLET ASSEMBLY now U.S. Pat. No. Des. 364,030, which is a Continuation-In-Part application of U.S. Ser. No. 29/015,696, filed Nov. 24, 1993, for a CONNECTOR FOR A PALLET ASSEMBLY now U.S. Pat. No. Des. 354,606, which is a Continuation-In-Part application of U.S. Ser. No. 29/012,508, filed Sep. 2, 1993, for a TWO-PART INTERLOCKING PLASTIC PALLET, now U.S. Pat. No. Des 347,511, issued May 31, 1994, which is a Continuation-In-Part application of U.S. Ser. No. 29/007,372, filed April 21, 1993, for a TWO PART INTERLOCKING PLASTIC PALLET, now U.S. Pat. No. Des. 346,681, issued May 3, 1994, which is a Continuation-In-Part application of U.S. Ser. No. 07/961,396, filed Oct. 15, 1992, for a PLASTIC PALLET ASSEMBLY, now U.S. Pat. No. 5,343,814, issued Sep. 6, 1994, which is a Continuation-In-Part application of U.S. Ser. No. 644,928, filed Jan. 23, 1991, now U.S. Pat. No. 5,197,395, issued Mar. 30, 1993, for a PLASTIC PALLET WITH DECK ASSEMBLY, which is a Continuation-In-Part application of U.S. Ser. No. 230,025, filed Aug. 9, 1988, for a PLASTIC PALLET, now U.S. Pat. No. 4,843,976, issued Jul. 4, 1989.

TECHNICAL FIELD

The present invention relates to pallets for storing and transporting goods, and more particularly to a pallet comprising a base and a deck connected by a plurality of connectors. The pallet can be easily assembled for supporting goods and easily disassembled for transportation and storage.

BACKGROUND PRIOR ART

It is customary to transport goods and to store goods on pallets. Palletized goods are maintained in a position above the flooring which can be very advantageous in areas where there is flooding or where the condition of the flooring is either rough or of concern. Standard pallets are particularly useful in materials handling because forklift equipment can maneuver the pallets by inserting their forklift tines into channels provided by the pallet. Typically, pallets are constructed of wood. In the past, wooden pallets have provided advantages of economy, simplicity and durability, principally because of the lack of other suitable materials. However, wooden pallets are extremely heavy and require costly hand labor in their fabrication.

In the past decades, disposable pallets have been proposed and, with the growth of the plastics industry, a wide variety of plastics have been investigated to determine their suitability for use in producing pallets. Plastic pallets can easily be molded and are stronger and lighter in weight than wooden pallets; also, they can now be made with recyclable materials. Furthermore, plastic pallets are more durable than wooden pallets.

Recent plastic pallets that are light in weight, durable, capable of supporting heavy loads, easy to manufacture and have a minimum number of interchangeable parts are disclosed in Ser. No. 29/024,050, filed Jun. 7, 1994 for a PLASTIC PALLET ASSEMBLY, U.S. Pat. No. DES 347,511 for a TWO-PART INTERLOCKING PLASTIC PALLET, U.S. Pat. No. DES 346,681 for a TWO PART INTERLOCKING PLASTIC PALLET, U.S. Pat. No. 5,343,814 for a PLASTIC PALLET ASSEMBLY, U.S. Pat. No. 5,197,395 for a PLASTIC PALLET WITH DECK ASSEMBLY, and U.S. Pat. No. 4,843,976 for a PLASTIC PALLET. The pallets and connectors disclosed in these patents and Applications have been highly successful. In an effort to improve thereon, to reduce the cost and weight of the pallets and to increase strength yet not decrease durability, the pallet of the present invention was developed. The present pallet is useful in material handling and designed for use with forklift equipment.

SUMMARY OF THE INVENTION

According to a first aspect of the present invention, a pallet base, a pallet deck, a plurality of separate connectors, and a plurality of internal, integral connectors is disclosed. The pallet base has an inner surface and an outer surface, a pair of substantially parallel side members and a pair of substantially parallel end members that are substantially perpendicular to the side members, a first cross member disposed between and connected to the end members, and two second cross members disposed between and connected to the side members. The inner surface has a plurality of spaced apart transverse inner ribs projecting therefrom and the opposed outer surface has a plurality of spaced apart transverse outer ribs projecting therefrom. The side members, the end members and the cross members are generally U-shaped in cross-section.

Specifically, the side members, the end members and the cross members of the pallet base include a substantially horizontal second portion having two sides with a ramp portion and a substantially horizontal first portion integral with each of the two sides of the horizontal second portion, the outer surface of the ramp portions and the horizontal second portion being concave. The pallet base further includes a plurality of openings therein for receiving the separate connectors and the integral, internal connectors for cooperating with the connected pallet deck.

According to a second aspect of the present invention, a generally rectangular pallet deck is disclosed that has a first side, an opposed second side, a first end and an opposed second end and is also interconnected to the pallet base by the separate connectors. The deck further includes a substantially planar outer surface with perimeter reinforcement means, an inner surface with a reinforcement structure projecting outwardly therefrom, openings for receiving the separate connectors, and a plurality of integral, internal connectors for cooperating and mating with the pallet deck.

According to a further aspect of the present invention, internal connectors are disclosed having a first element integral with the inner surface of the base cooperating with a second element integral with the inner surface of the deck. These internal connectors are used in addition to the four separate connectors. Each separate connector is at a corner of the pallet and disposed between the base and the deck and further cooperates with openings in each of the deck and the base. As to the integral internal connectors, the first element includes a central core with projections thereon and the second element includes a sleeve with inwardly projecting spokes and an internal, central receiving core having an opening at the distal end thereof adapted to receive the central core of the first element and means for receiving and seating the projections of the first element. The projections of the first element are formed by circumferentially spaced slots extending from the distal end of the first element which produce a set of tangs and each tang has a barb formed adjacent the distal end thereof and the receiving core of the second element has an opening at the distal end thereof to receive the central core with tangs. In addition, each barb has a flat lower surface which extends perpendicular to the axis of the core and has a tapered outer surface extending from the outer edge to define a ramp.

According to still a further aspect of the present invention, the second element further includes, at opposed sides on the sleeve, a projecting post with a barb thereon for cooperating with the first element.

According to yet another aspect of the present invention, the separate connectors include a central hollow core member having slots extending from opposite ends to produce a plurality of flexible tangs at opposite ends of the core member, a plurality of radial spokes extending from the periphery of the core member between the tangs, a non-circular sleeve surrounding the core member and being integral with outer ends of the spokes, and an inwardly-directed integral force-absorbing flange between the tangs. The sleeve is rectangular and the radially spaced spokes are spaced approximately 30 to 60 degrees apart; they are spaced at 45, 35 and 55 degrees from one another. A plurality of transverse spokes are integral with at least two radial spokes for added stability and strength. Moreover, the hollow core member is circular and the slots terminate in close proximity to planes defined by the spokes. As with the internal connectors, each of the tangs has a barb formed adjacent a free edge thereof and each barb has a lower flat edge extending perpendicular to the axis of the hollow core member. Finally, the tang spans approximately ninety degrees, the tangs at each opposed end are circumferentially offset from the tangs at the other opposed end.

DETAILED DESCRIPTION

Figure 1:
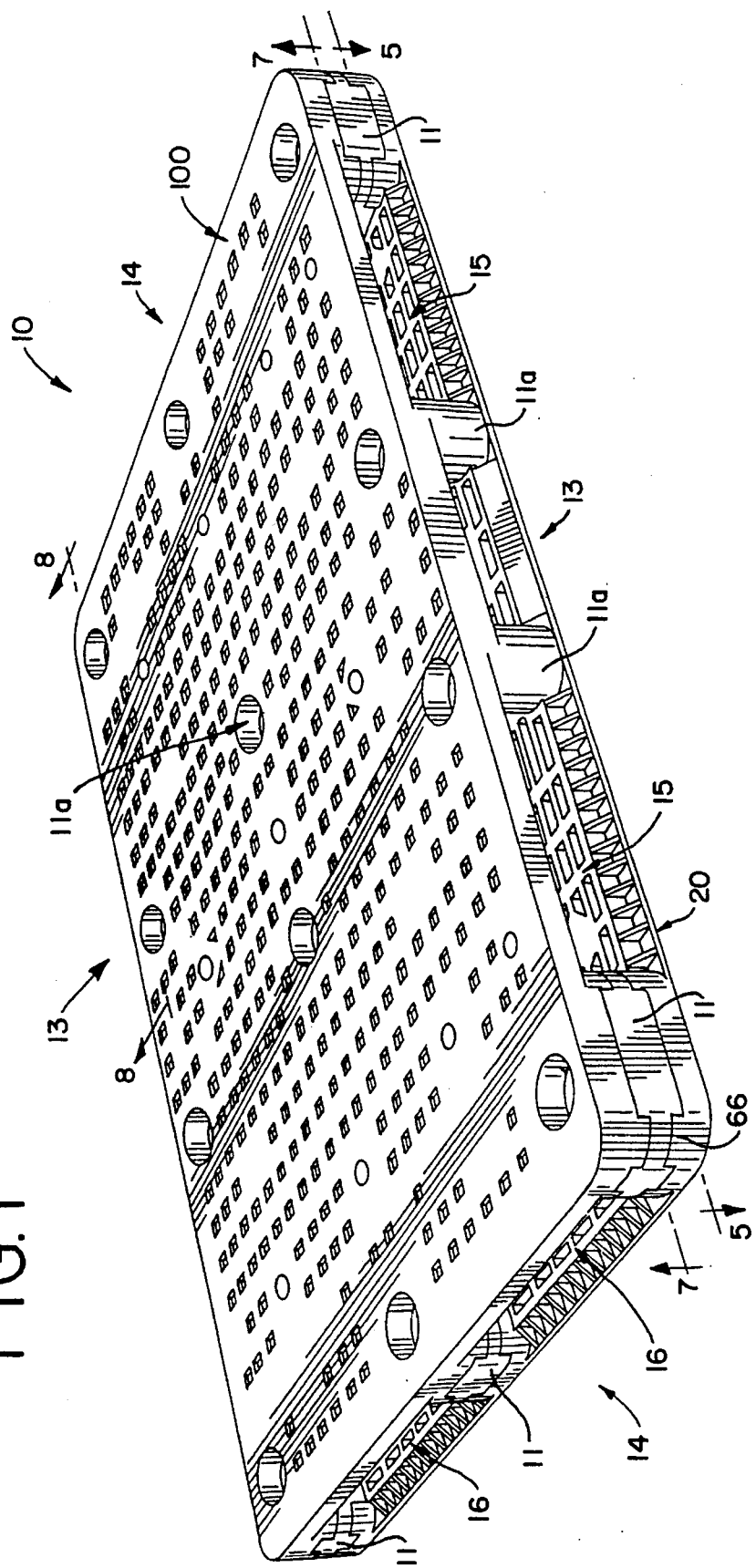
FIG. 1 is a perspective top view of the plastic pallet comprising a deck, a base and a plurality of connectors made in accordance with the teachings of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

A. The Pallet Assembly

Figure 2:
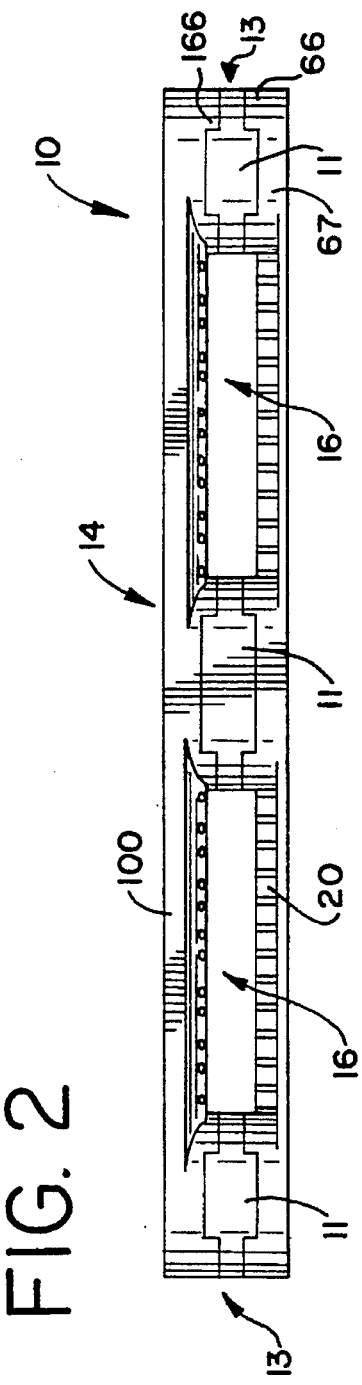
FIG. 2 is a first end elevation view of the pallet of FIG. 1, the second, opposed end elevation view being a mirror image thereof.
Figure 3:
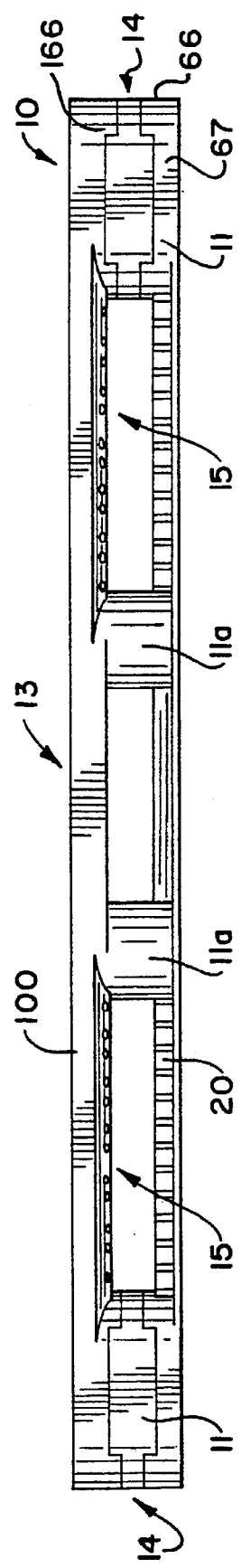
FIG. 3 is a first side elevation view of the pallet of FIGS. 1 and 2, the second, opposed side elevation view being a mirror image thereof.

FIGS. 1–3 of the drawings show a plastic pallet, generally designated by reference numeral 10, having three primary components. The components are a base 20, a deck 100 and a plurality of connectors 11. The connectors 11, interconnecting the deck and base, are specially designed so the pallet can be assembled without the need for specially designed tools, and the connectors can be snap-fitted onto the deck and base.

In the preferred embodiment, the pallet incorporates six (6) separate connectors 11 and six (6) integral connectors 11a. Both the deck and the base have openings which define surrounding abutments recessed below the exposed surface and the connectors (separate and integral) have flexible tangs with barbs which engage the abutments. The pallet 10 has opposed sides 13 and opposed ends 14. In the illustrated embodiment, the separate connectors 11 are shown positioned at the four corners of the base and deck members and midway along each opposed end 14. Integral connectors or connection means 11a are built into the base and deck of the pallet along the sides 13 between the corners and in internal rows parallel to the ends 14. The connectors 11, 11a are positioned so forklift tines can be inserted into side channels 15 and end channels 16 for lifting and moving the assembled pallet and the palletized goods. The six separate connectors are positioned where, it has been found, there are the highest probabilities of potential damage. Specifically, misdirected loads fall upon or misaligned forklift contact the corner areas most frequently. Thus, broken connectors located in these areas can be easily removed and replaced.

The six separate connectors are positioned with one in each corner and one between the corners, on the short side, here the ends 125, 126 of the pallet. The integral connectors are placed along the long side, here the sides 123, 124 of the pallet, to allow a longer side. The extra internal supports permit the overall size of the pallet to be larger than prior pallets. They reduce the distance between connectors, minimizing "bowing" due to the weight of the load being supported.

Finally, the channels 15, 16 are unobstructed within the pallet. The connectors 11, 11a are oriented and sized so that the forklift tines can be inserted into either side or end and pass, without obstruction, through the pallet. See FIG. 7, wherein the orientation of the connectors is shown and the distances, designated X and Y, for the channels 15, 16 is shown.

B. The Base

Figure 4:
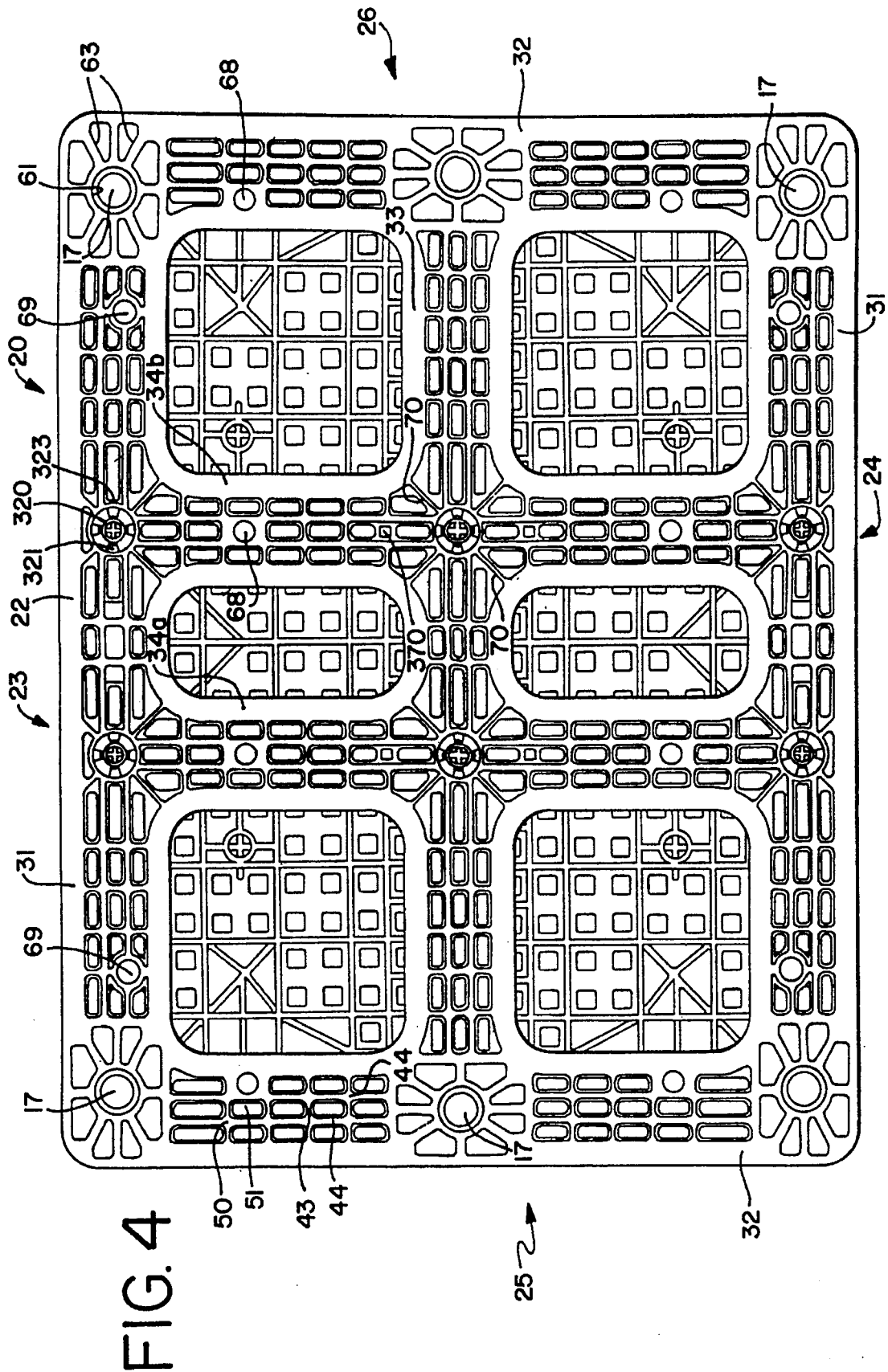
FIG. 4 is a bottom plan view of the base of the pallet of FIGS. 1–3.

The base 20 of the present invention, shown in detail in FIGS. 4, 5, 8 and 10, is used below the deck 100 and while in use generally rests on the ground or floor. Because goods are not normally placed directly on the base 20, it is not a flat, continuous surface, rather it is much like a frame structure. The base supports the deck above the flooring. The base has two surfaces, namely an inner surface 21 (FIG. 5) and an outer surface 22 (FIG. 4). The outer surface 22 is the surface that faces out from the pallet; the surface that faces down and contacts the ground or floor when the pallet is constructed. The inner surface 21 is the surface facing the inside of the pallet, i.e., the surface the connectors are attached to and the surface facing the deck.

The base 20 is generally rectangular in shape. It has a first side 23, an opposed second side 24, a first end 25 and an opposed second end 26. The base structure itself includes a pair of substantially parallel side members 31 and a plurality of openings 17 therein (positioned at the four corners and midway along each end member 32) for receiving the separate connectors 11. A pair of substantially parallel end members 32 substantially perpendicular and connected to the side members 31 are provided. Like the side members 31, the end members 32 have an opening 17 therein at their corners and midway therein for receiving the separate connectors 11.

A first cross member 33 parallel the side members 31 with openings 17 at each end for receiving the separate connectors 11 is disposed between and connected to the end members 32. A second cross member 34a and third cross member 34b, both parallel the end members 32, are disposed between and connected to the side members 31.

Figure 10:
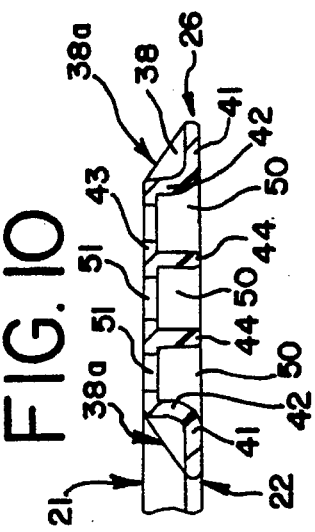
FIG. 10 is a cross-sectional view along line 10—10 in FIG. 5.

Turning to FIG. 10, there is shown a cross section of an end member 32, which is similar to a side member 31 and cross member 33, 34a, 34b. The end members 32, like the side members 31 and cross members 33, 34a, 34b, are generally U-shaped in cross-section. In particular, at the outermost sides (26), the end member 32 has two horizontal longitudinal portions 41 which are integral with upwardly projecting, substantially vertical longitudinal portions 42 which, in turn, are connected to a centrally located second horizontal longitudinal portion 43. This second horizontal longitudinal portion 43 is positioned above the first horizontal longitudinal portions 41 adjacent the sides. Thus, the concave surface formed by the upwardly projecting longitudinal portions 42 and second horizontal longitudinal portion 43 of the end members (and the side members and cross members) is the outer surface 22.

There are two parallel intermediate substantially vertical longitudinal portions 44 running parallel to the upwardly projecting, substantially vertical longitudinal portions 42. These intermediate longitudinal portions 44 also form the outer surface 22 of the base 20.

Intersecting the vertical longitudinal portions 42 and passing through the intermediate longitudinal portions 44 are a plurality of spaced-apart vertical transverse portions 50. Each vertical transverse portion 50 terminates at a vertical longitudinal portion 42.

Holes 51 are formed between the vertical longitudinal portions 42 and each intermediate longitudinal portion 44 and between the intermediate longitudinal portions 44 in the space between the vertical transverse portions 50.

The inner surface 21 (FIG. 5) is relatively smooth and U-shaped with the plurality of spaced, parallel transverse inner ribs 38 integral with the inner surfaces of the first horizontal longitudinal portion 41, upwardly projecting longitudinal portions 42 and the second horizontal longitudinal portion 43. The innermost surface 38a of the transverse inner ribs 38 act as guides or ramps for the forklift tines. Thus, if a tine hits the inclined surface 38a, rather than pushing the pallet, it will slide along the incline to its proper position.

As noted, the inner surface 21 and outer surface 22 of side members 31 and cross members 33, 34a, 34b are similar to the end members 32 just described.

There are twelve (12) connectors, six (6) separate connectors and six (6) integral, built-in connectors.

As to the separate connectors 11, openings 17 are formed by sleeves and spokes built at the corners and midway along the end member 32 at the point where the first cross member 33 intersects thereto of the base 20 for cooperating therewith.

Figure 5:
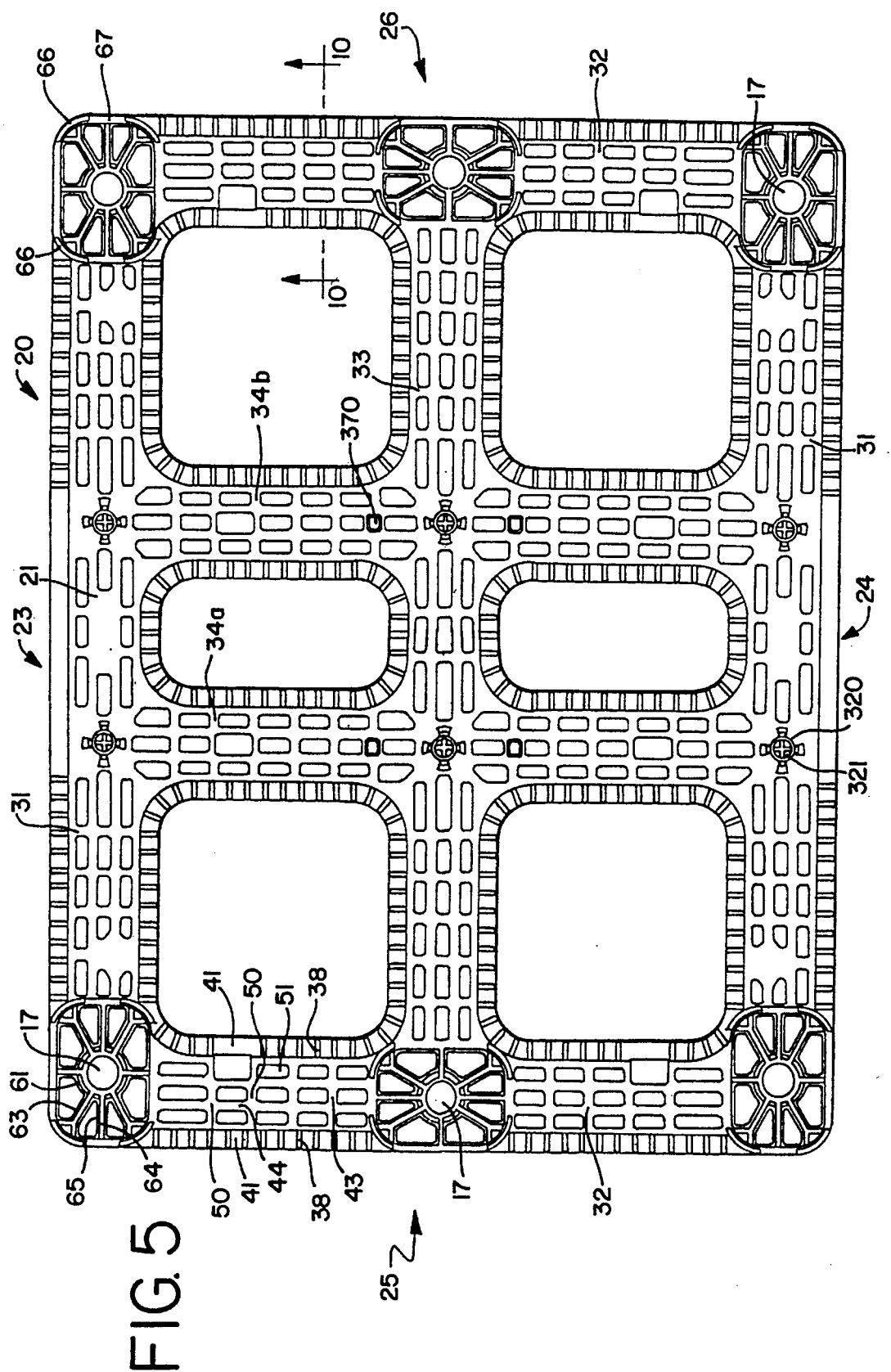
FIG. 5 is a top plan view of the base of the pallet of FIGS. 1–4 with the deck removed along line 5—5 in FIG. 1.
Figure 8:
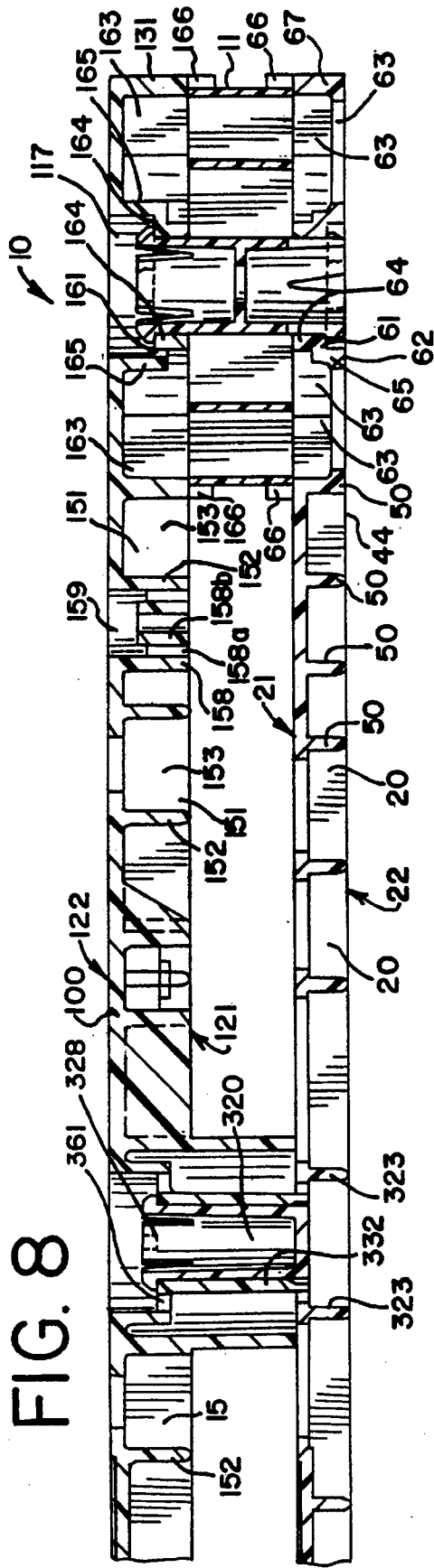
FIG. 8 is a cross-sectional view along line 8—8 in FIG. 1.

As shown in FIGS. 4, 5 and 8, the base 20 has openings 17 adapted to receive the tangs of the connectors 11. The openings 17 are surrounded by circular, outer recessed abutments 61 that are recessed below the plain of the adjacent outer surface 62, 22 of the base. The recessed abutments 61 are formed by a substantially vertical first annular wall 64 and a substantially vertical second annular wall 65. The outer recessed abutments 61 are generally circular and connected along with the first and second annular walls 64, 65 by spokes 63 to the vertical transverse and longitudinal portions 42, 44, 50 (FIG. 5).

To assist in guiding, orienting and seating the connectors and for added protection, substantially vertical guide walls or posts 66 are formed into the base 20 in the inner surface 21 thereof. The guide walls 66 are contoured to follow the external corner surfaces of the connectors.

Similarly, at the places where the connectors are attached, the first horizontal longitudinal portion 41 and the transverse inner ribs 38 are replaced by vertical support walls 67. The connectors are seated on these vertical support walls 67 and the guide walls 66 project therefrom.

The connectors 11, discussed in detail below, can thus be snapped into the base, on and adjacent to the inner surface 21, by applying axial force to the connectors so the barbs of the connectors will snap into position onto the outer recessed abutment 61. With this construction, the barbs will not extend out beyond the outer plain of the outer surface 22. After all of the connectors are assembled on one base, the deck is positioned as shown in FIG. 1 and a force is applied to the outside surface of the deck to complete the assembly of the plastic pallet.

Shown in FIG. 4, the pallet base has a circular support wall 69 projecting outwardly from the outer surface 22 adjacent each of the corner connector openings 17. In addition, ports 68 are provided for adding molten plastic under pressure to the mold for making the bases. Excess molding material around the ports 68 can be cut, sanded or scraped off the final product.

Finally, as seen in FIG. 4, "X-shaped" ribs 70 are formed projecting outwardly from the outer surface 22 of the base 20 adjacent the internal connectors (320).

C. The Deck

Figure 6:
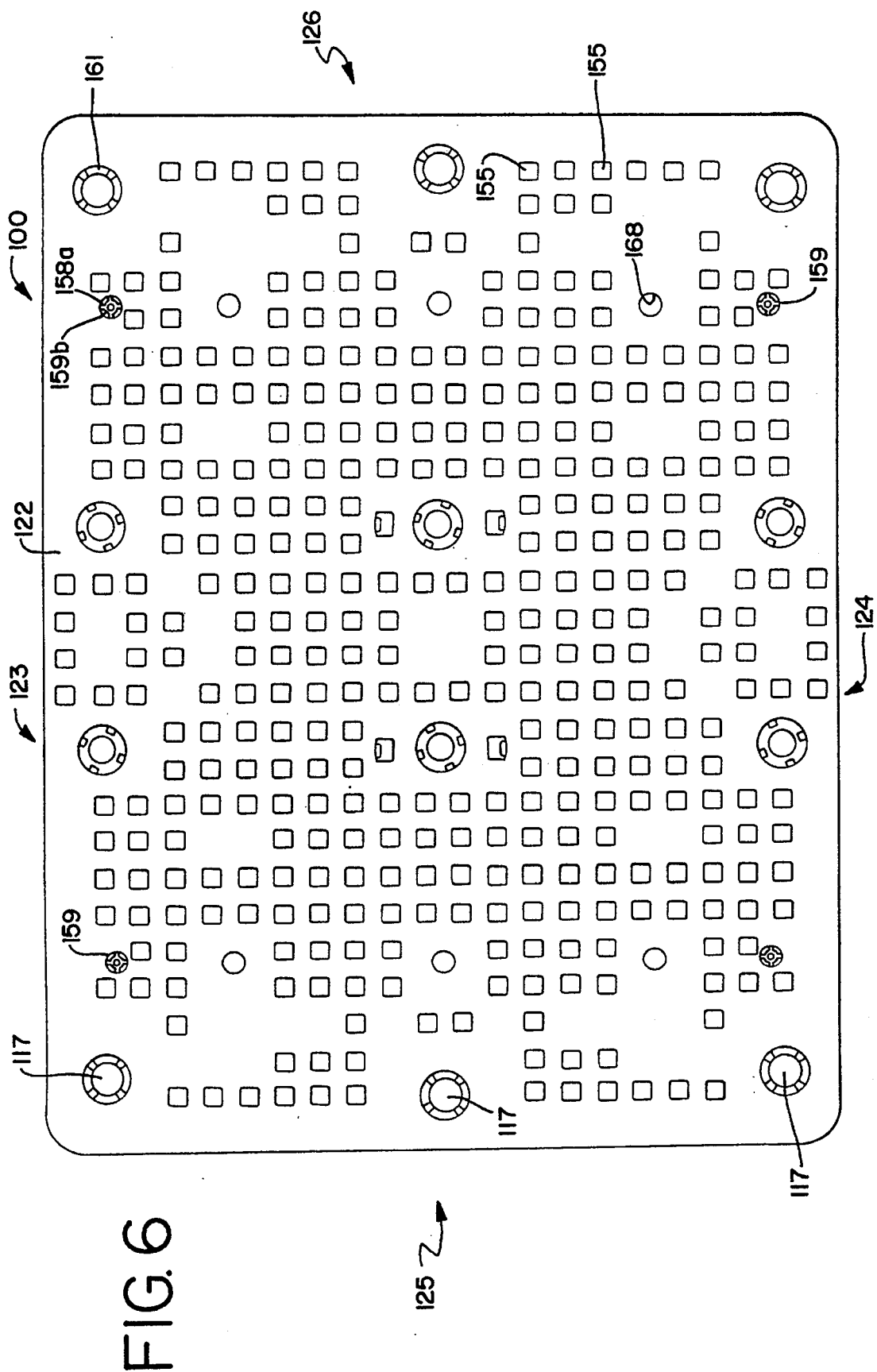
FIG. 6 is a top plan view of the deck of the pallet of FIGS. 1–5.

In the pallet, the base 20 is connected, via separate connectors 11 and integral connectors 11a, to a deck 100 (shown in FIGS. 1–3, 6, 7, 8, 9 and 9A). It is the deck the goods are placed on. The deck 100 has two surfaces, namely an inner surface 121 (FIG. 7) and an outer surface 122 (FIG. 6). The outer surface 122 is the surface which faces out from the pallet; specifically it is the surface which faces up and contacts the goods being palletized. The inner surface 121 is the surface facing the inside of the pallet, i.e., the side the connectors are attached to, and the base 20.

The deck 100 is generally rectangular in shape. It has a first side 123, an opposed second side 124, a first end 125 and an opposed second end 126. The outer surface 122 is substantially planar and includes perimeter reinforcement means. The end perimeter reinforcement means and side reinforcement means are similar and (FIG. 9) includes a substantially vertical perimeter first outer wall 131 and a first inclined outer wall 132 integral with a second inclined outer wall 133. The first inclined outer wall 132 includes a drain 134. Spaced and parallel intermediate transverse walls 135 are integral with and bridge the perimeter first outer wall 131 and the planar section of the inner surface 121.

Figure 9:
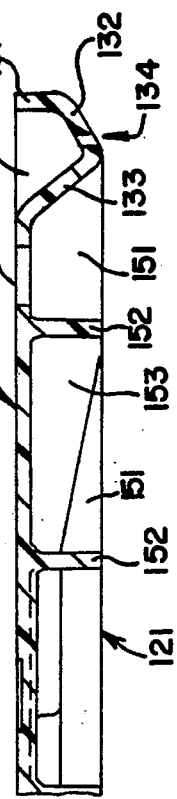
FIG. 9 is a cross-sectional view along line 9—9 in FIG. 7.
Figure 9A:
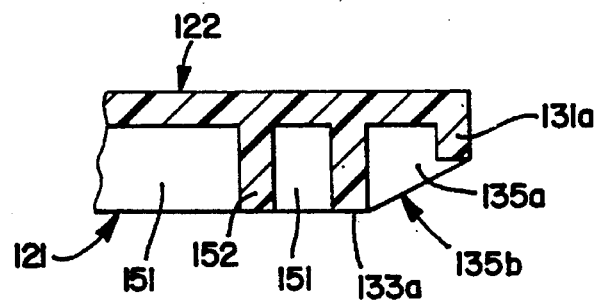
FIG. 9A is a cross-sectional view of alternative construction to that shown along line 9—9 in FIG. 7.
Figure 11:
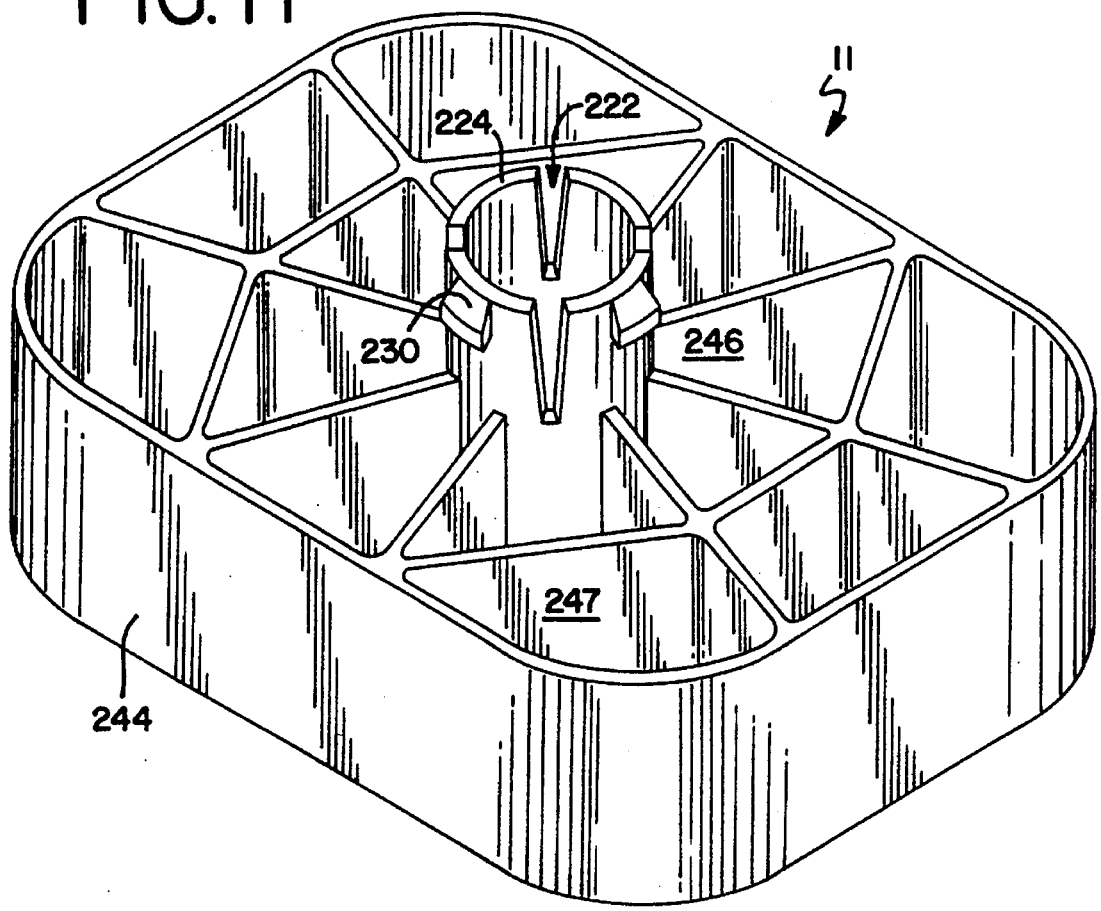
FIG. 11 is a perspective top view of a separate connector for use with the pallet of FIGS. 1–10.

In the alternative, as shown in FIG. 9A, the side and end perimeter reinforcement means may be configured to include a substantially vertical perimeter first outer wall 131a and an integral substantially vertical second outer wall 133a, the second outer wall extending out further from the base of the planar inner surface 121 of the base 100 a further distance than the first outer wall. Spaced and parallel intermediate transverse walls 135a or gussets having an inclined, exposed surface 135b integral with and bridge the two perimeter outer walls 131a, 133a and the planar section of the inner surface. In this construction, no drain is necessary.

In practice, this second embodiment, FIG. 9A, has been shown to be stronger than the first embodiment, FIG. 9, in taking repeated, external strike forces thereto.

Both the side and the end perimeter reinforcement means are hooked-shape (FIG. 9) or U-shaped (FIG. 9A) in cross-section. The concave surface of the reinforcement means is the outer surface 122 in the hook-shaped design (FIG. 9) and the inner surface in the U-shaped design (FIG. 9a). The first inclined outer walls 132 or the combination of the first and second outer walls 131a, 133a with the inclined surface 135b of the transverse walls 135a act as guides or ramps for the forklift tines. Thus, if a tine hits the inclined wall, rather than pushing the pallet, it will slide along the incline to its proper position.

Figure 7:
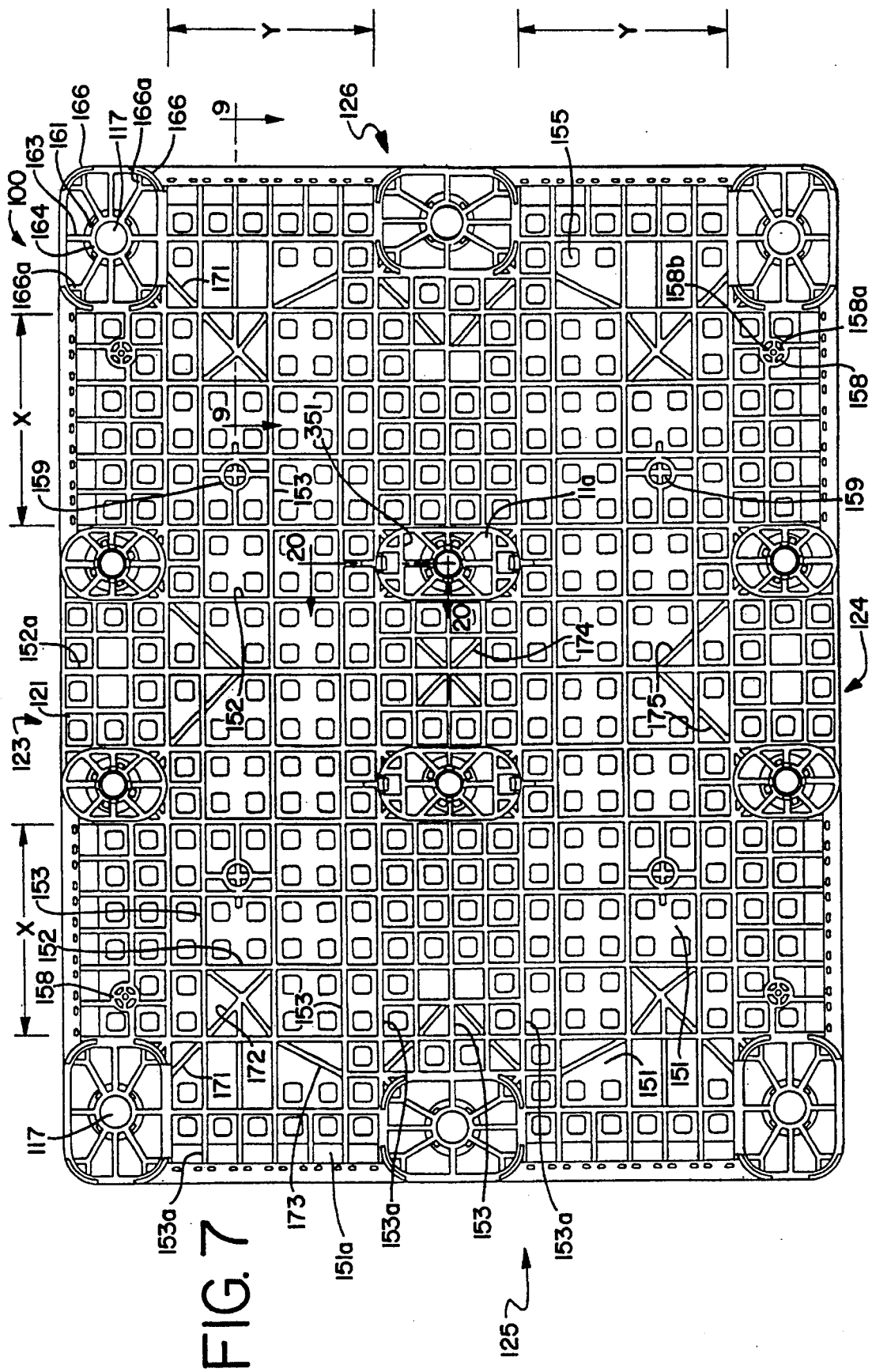
FIG. 7 is a bottom plan view of the deck of the pallet of FIGS. 1–6 with the base removed along line 7—7 in FIG. 1.

The inner surface 121 of the deck has a reinforcement structure projecting outwardly therefrom. This reinforcement structure includes a plurality of cells 151 formed by a plurality of parallel end walls 152 and a plurality of side walls 153. The cells 151 are substantially rectangular and, apart from the perimeter cells 151a, the cells 151 are approximately the same size. The matrix formed by the end walls 152 and side walls 153 is shown in FIG. 7. Most of the perimeter cells 151a include a second end wall 152a between the end walls 152 and a second side wall 153a between the side walls 153.

As discussed previously, there are preferably twelve (12) connectors, six (6) separate connectors and six (6) integral, built-in connectors. As to the separate connectors 11, openings 117 are formed by sleeves and spokes built at the corners and midway along the ends 125, 126 of the deck 100 for cooperating therewith.

The openings 117 are adapted to receive the tangs of the connectors 11. The openings 117 are also surrounded by circular, outer recessed abutments 161 that are recessed below the plain of the adjacent outer surface 122 of the base. The recessed abutments are formed by and between a substantially vertical first annular wall 164 and a substantially vertical second annular wall 165. The outer recessed abutments 161 are generally circular and connected along with the first and second annular walls 164, 165 by spokes (in the form of webs) 163 to the substantially vertical perimeter first outer wall 131 and the end walls 152 or the side walls 153.

To assist in guiding, orienting and seating the connectors and for added protection, substantially vertical guide walls or posts 166 are formed into the deck 100 in the inner surface 121 thereof. These guide walls also prevent the connectors from being knocked out of position by misaligned forklift tines. The guide walls 166 are contoured to follow the external corner surfaces of the connectors. Upwardly projecting teeth 166a may also be used to assist in guiding the connectors and preventing them from getting knocked out of place when contacted. The sleeve of the connector being positioned between the teeth 166a and the guide walls 166.

The channels 15, 16 are kept unobstructed within the pallet. As seen in FIG. 7, the connectors 11, 11a are oriented and sized so the forklift tines can be inserted into either side or end and pass, without obstruction, through channels of a predetermined width, designated X and Y, in the pallet.

As discussed before, the connectors 11, can thus be snapped into the deck, on and adjacent to the inner surface 121, by applying axial force to the connectors so the barbs of the connectors will snap into position onto the outer recessed abutment 161. With this construction, the barbs will not extend out beyond the outer plain of the outer surface.

As further seen in FIG. 7, for added strength there are centrally located central side walls 153a generally bisecting the cells 151 and centrally located central end walls 152a along and between the intermediate openings along the ends. Moreover, it should be noted that most of the cells 151 include apertures 155 for drainage and to reduce the amount of material used. To avoid the problem of having goods falling through the deck, the apertures are not large.

Shown in FIGS. 6, 7 and 8, the pallet deck has a circular support wall 158 projecting outwardly from the inner surface 121. Spokes 158a project inwardly from the circular support wall 158 and terminate at a circular sleeve 158b for permitting rubber pads to be placed on the opposite surface. As to the outer surface (FIG. 6), rubber pads (not shown) may be secured in the spaces designated 159 (formed by the circular support wall 158 and the circular sleeve 158b shown on the inner surface) onto the outer surface 122. These pads (159) near the corners can protect the base while it is stored and stacked. The pads also assist in preventing the goods resting on the outer surface of the deck from slipping. Similarly, on the opposite surface (FIG. 7), namely the inner surface 122, similar circular pads, designated 159, are provided on the inner surface. These pads 159, in which there are four, contact the forklift tines that pass between the connectors into either the side channels 15 or the end channels 16. Thus, if the forklift stops abruptly, the pads will prevent the pallet from slipping on the tines.

Turning again to FIG. 7, the cells 151 diagonally adjacent the openings 117 at the corners of the deck 100 include a diagonal intermediate cross wall 171. The cells diagonally adjacent these cells 151 with a diagonal intermediate cross member 171 include four inclined cross walls 172 projecting inwardly from the corners of the cell. An additional inclined cross wall 173 is present in a further cell adjacent the one with the four inclined cross walls 172.

In the center of the pallet base 100 (the four center cells 151), there is an X-shaped support (and force absorbing and directing) wall 174 formed within the cells. Similarly, adjacent the connectors, as shown in FIG. 7, there are inwardly directing V-shaped 175 support, force absorbing and distributing walls formed within the cells.

These inclined, diagonal X-shaped, V-shaped walls not only add strength, but also assist in the mold making process. The additional walls act as channels, additional channels, to facilitate the flow of the molten, pressurized plastic through the mold and to reduce the natural resistance to such flow.

Directly opposite the four inclined cross walls 172 of the inner surface 121, on the outer surface 122, are ports 168 for adding molten plastic under pressure to the mold for making the decks. Excess molding material around the ports 168, like the ports 68 for the base, can be cut, sanded or scraped off the final product.

D. The Separate Connectors

The details of one type of connector (circular) are disclosed and claimed in the invention by the same inventors of the present invention, embodied in U.S. Pat. No. 4,843,976 for a PLASTIC PALLET, which is incorporated herein by reference. The details of a second type of connector (rectangular) are shown in the present FIGS. 11–15 and 11A.

Each connector 11 includes a hollow central circular core 220 that has circumferentially spaced slots 222 extending from opposite ends thereof which produce first and second sets of tangs 224, 226. Each tang 224, 226 is identical in construction and has a barb 230 formed adjacent the free, distal end thereof. Each barb 230 has a flat lower surface 232 which extends perpendicular to the axis of the core 220 and has a tapered outer surface 234 extending from the outer edge to define a ramp.

Figure 14:
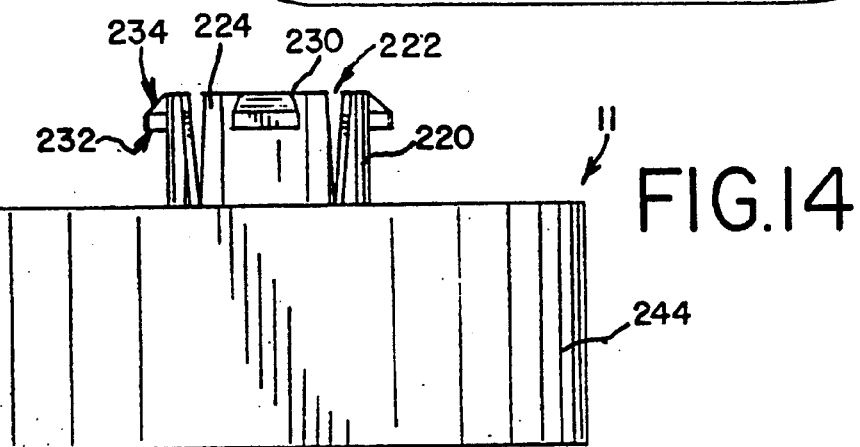
FIG. 14 is a right elevation view of the connector of FIGS. 11–13, the left elevation view being a mirror image thereof.
Figure 15:
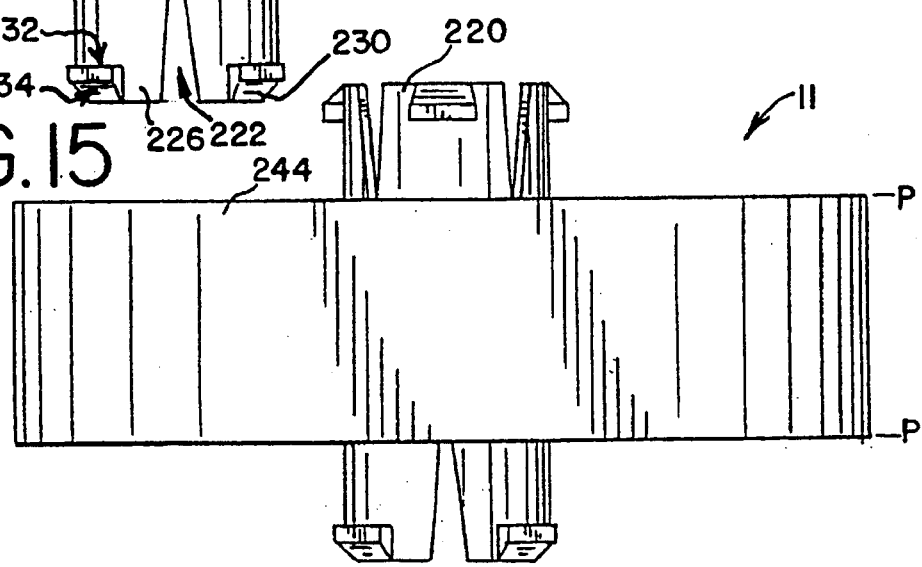
FIG. 15 is a front elevation view of the connector of FIGS. 11–14, the rear elevation view being a mirror image thereof.
Figure 17:
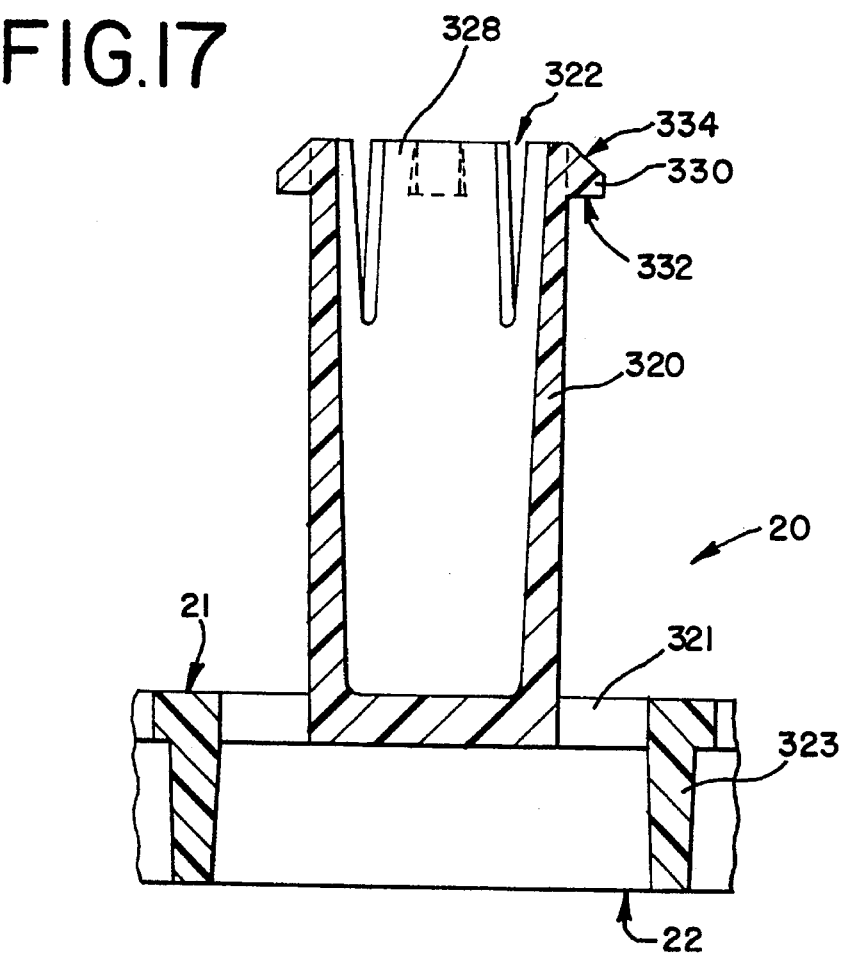
FIG. 17 is a cross-sectional view of the integral internal connector of FIG. 16.
Figure 16:
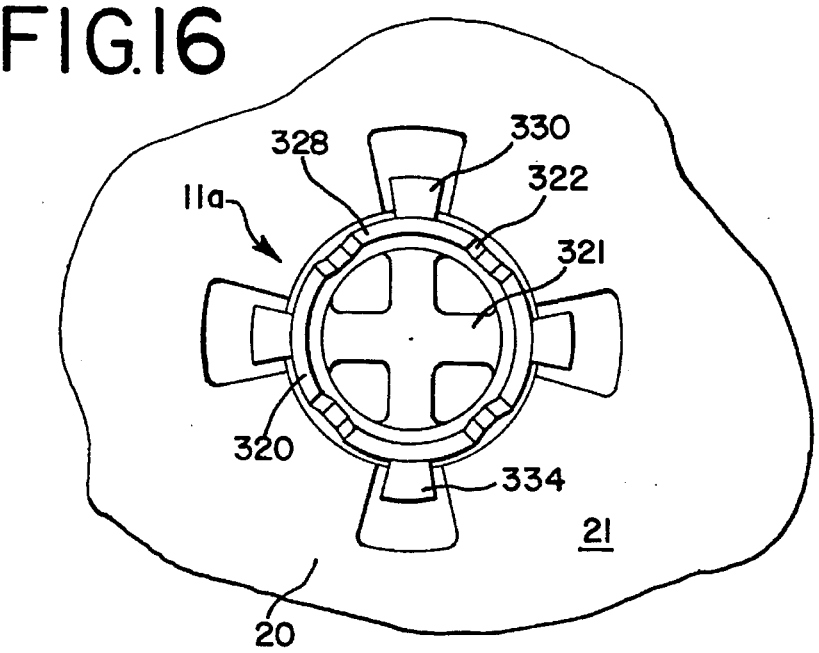
FIG. 16 is a top plan detailed view of the integral internal connector of the base.
Figure 19:
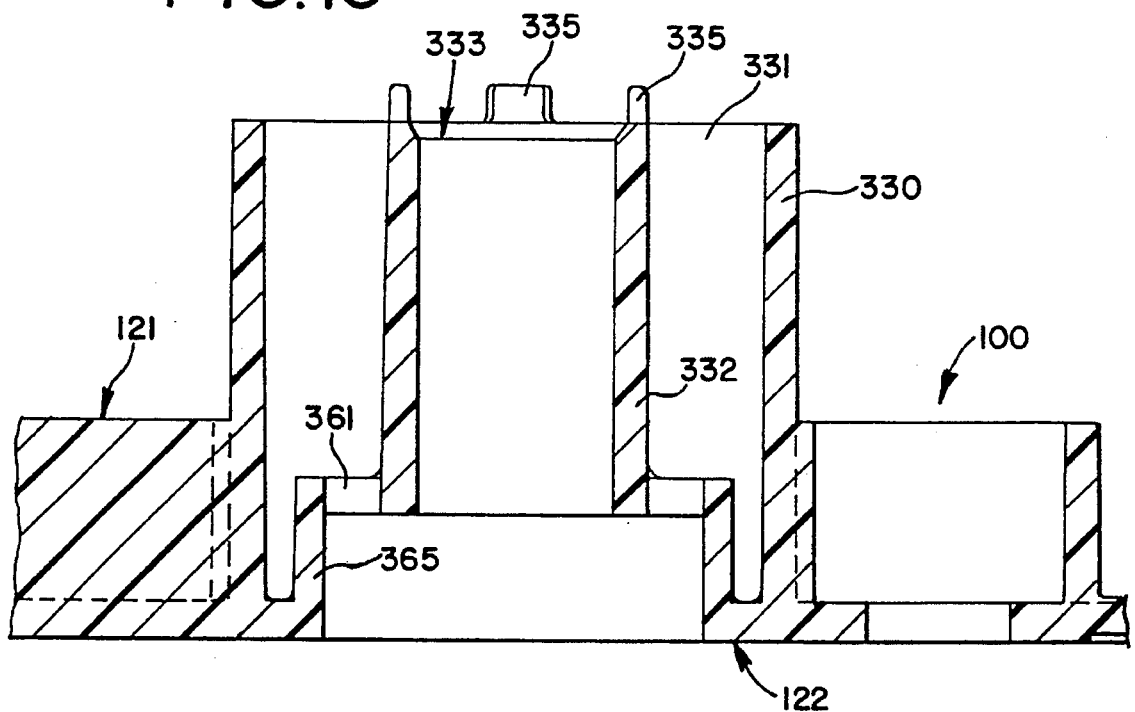
Figure 18:
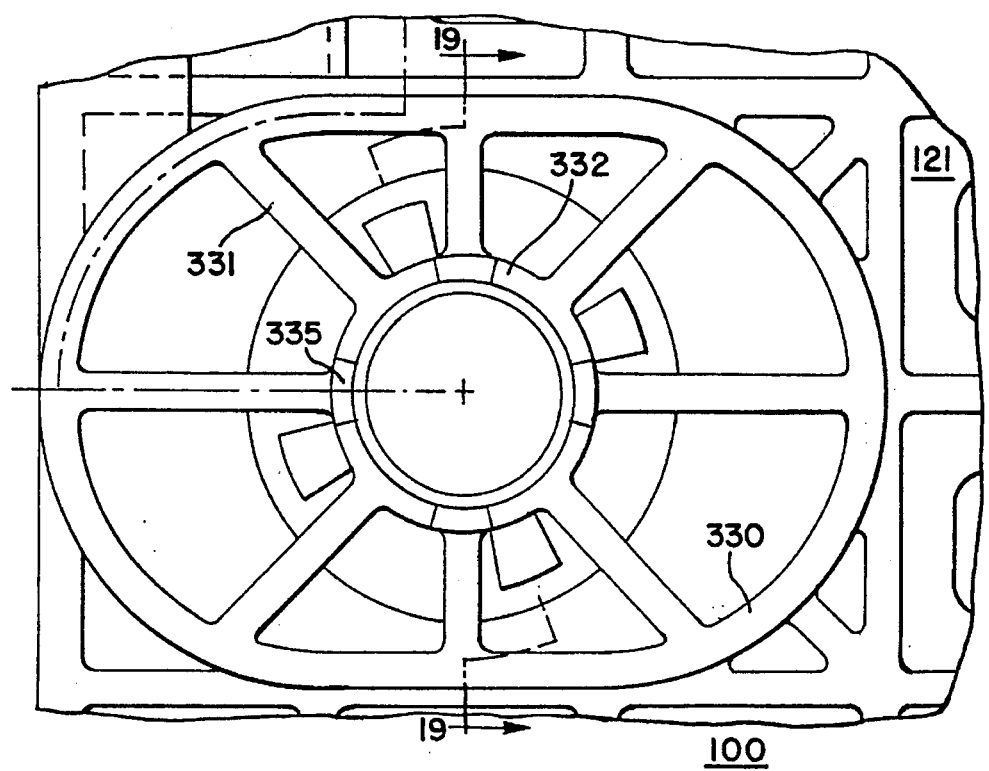
FIG. 18 is a bottom plan detailed view of the integral internal connector of the deck; and, FIG. 19 is a cross-sectional view of the integral internal connector along line 19—19 of FIG. 18; and, FIG. 20 is a cross-sectional view of the integral internal connector of along line 20—20 in FIG. 7.
Figure 20:
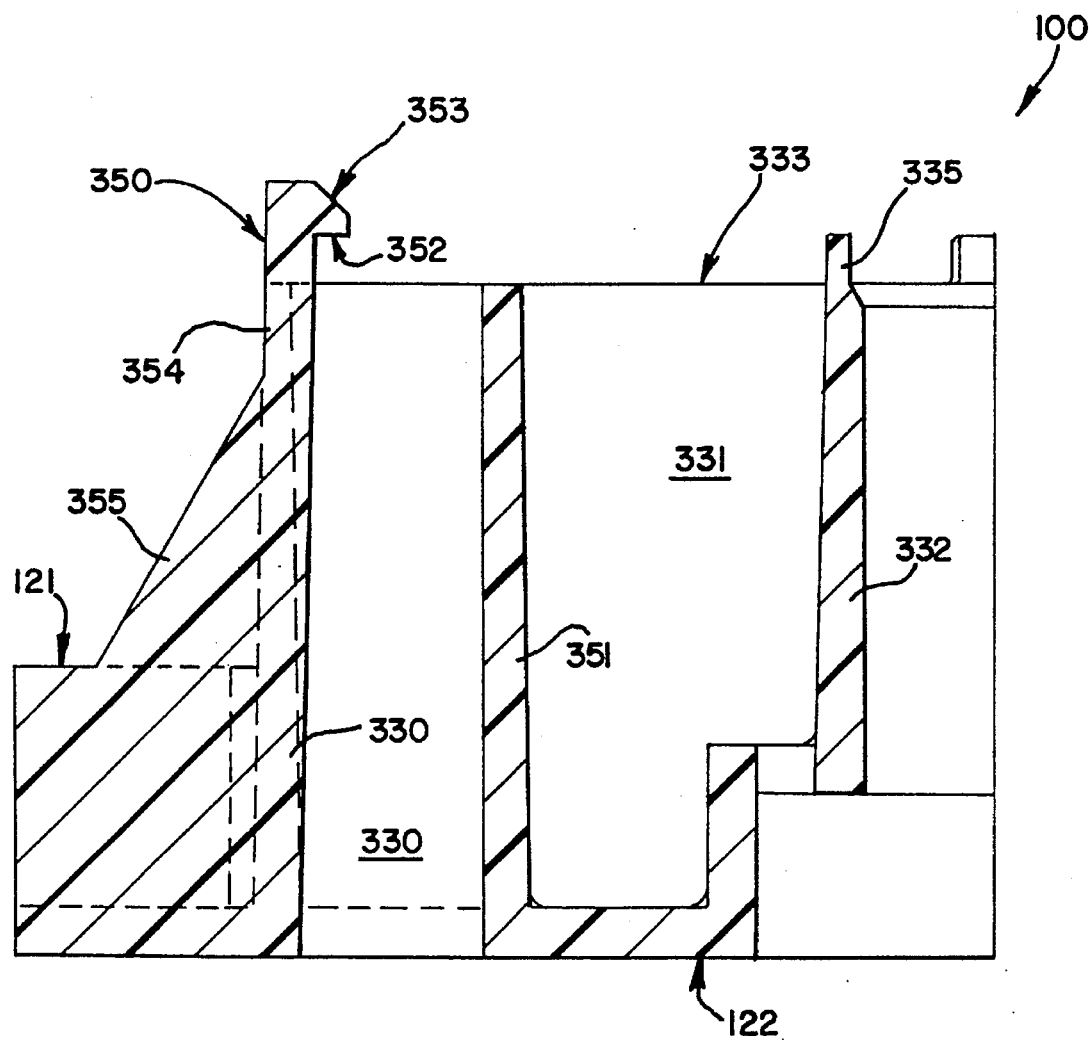

In the illustrated embodiment, four tangs are shown for each set 224, 226 with each tang spanning approximately ninety degrees. The tangs of the respective sets 224, 226 are circumferentially offset so the slots forming one set of tangs 224 are axially aligned with the centers of the opposite set of tangs 226 (FIGS. 14 and 15).

The central core 220 also has a force absorbing flange 236 located at the center of the core 220 and equally spaced from the two ends. Forces applied to the tangs are transmitted to the flange 236 where they are dissipated.

The connector 11 also includes a large rectangular sleeve 244 surrounding the core 220 and is connected thereto by radially extending spokes 246 and transverse spokes 247.

Figure 12:
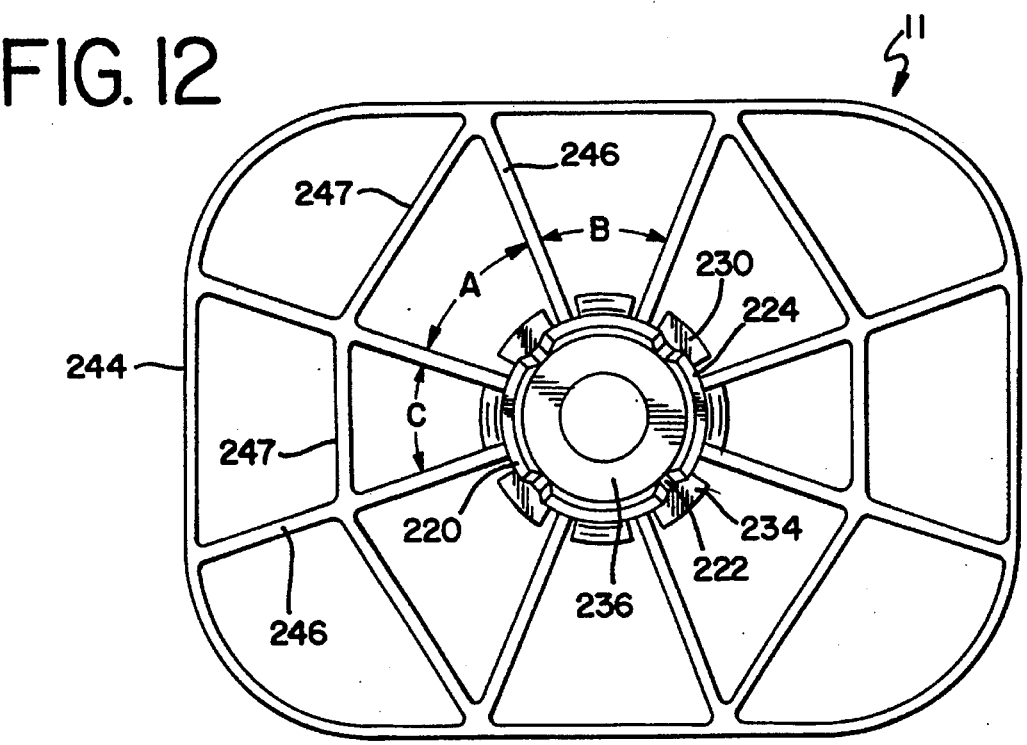
FIG. 12 is a top plan view of the connector of FIG. 11.
Figure 13:
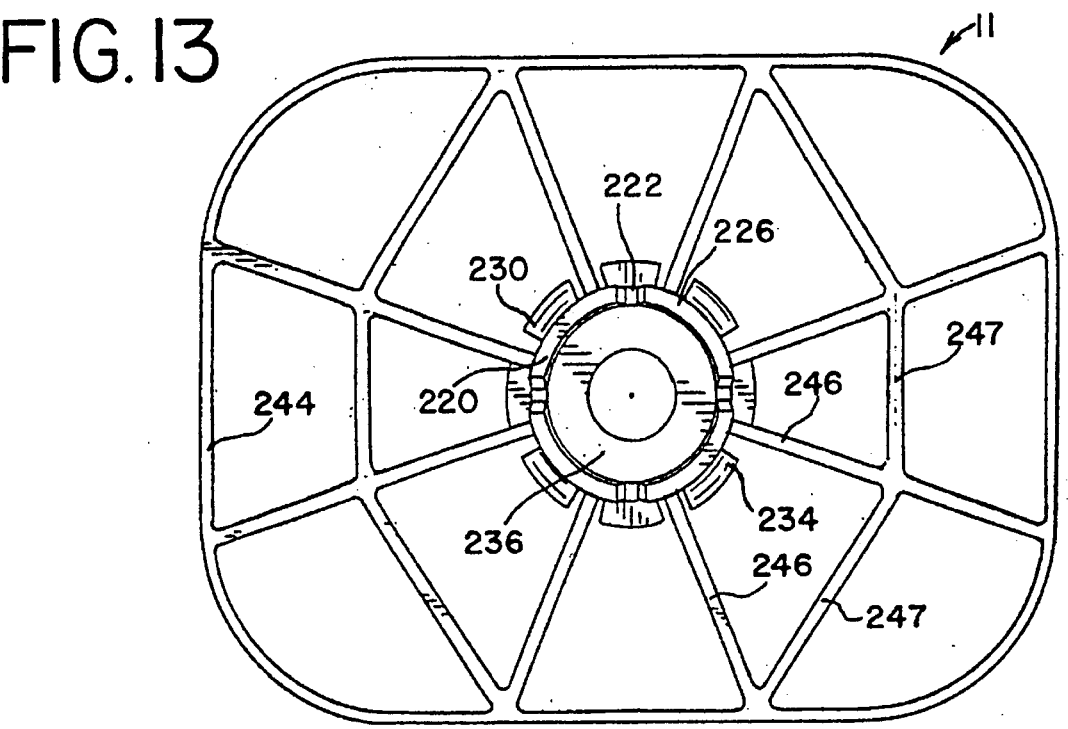
FIG. 13 is a bottom plan view of the connector of FIGS. 11–12.

The radial spokes 246 project from the core 220 at locations between the slots 222 forming the tangs 224, 226 (FIGS. 12 and 13). The radial spokes 246 are radially spaced from each other, as shown in FIG. 12, at three different angles, that being angle A, angle B and angle C. In the embodiment shown, angle A is 50 degrees, angle B is 45 degrees and angle C is 35 degrees. The angles for the radial spokes 246 are designed so the spoke absorbs external, inwardly directed forces to the outer sleeve 244. In practice, it has been found that forces caused by misaligned forklift tines striking the connectors, are resisted better when the radial spokes are oriented as shown. For example, as angle B increases the distance between the spokes at each spoke's junction with the sleeve, also increases, widening the distance between supports. The widening in distance between supports translates to an increase in the risk of breakage between supports. Of course the number of spokes may be increased, however, this adds to weight and amount of material used and to further complications in the molding process. Accordingly, a balance is made between these factors.

The transverse spokes 247 add transverse support to the radial spokes 246 and assist in distributing forces applied to the sleeves 244. The transverse spokes 247 also assist in minimizing the movement, and thus the weakening, of the radial supports 246.

Figure 11A:
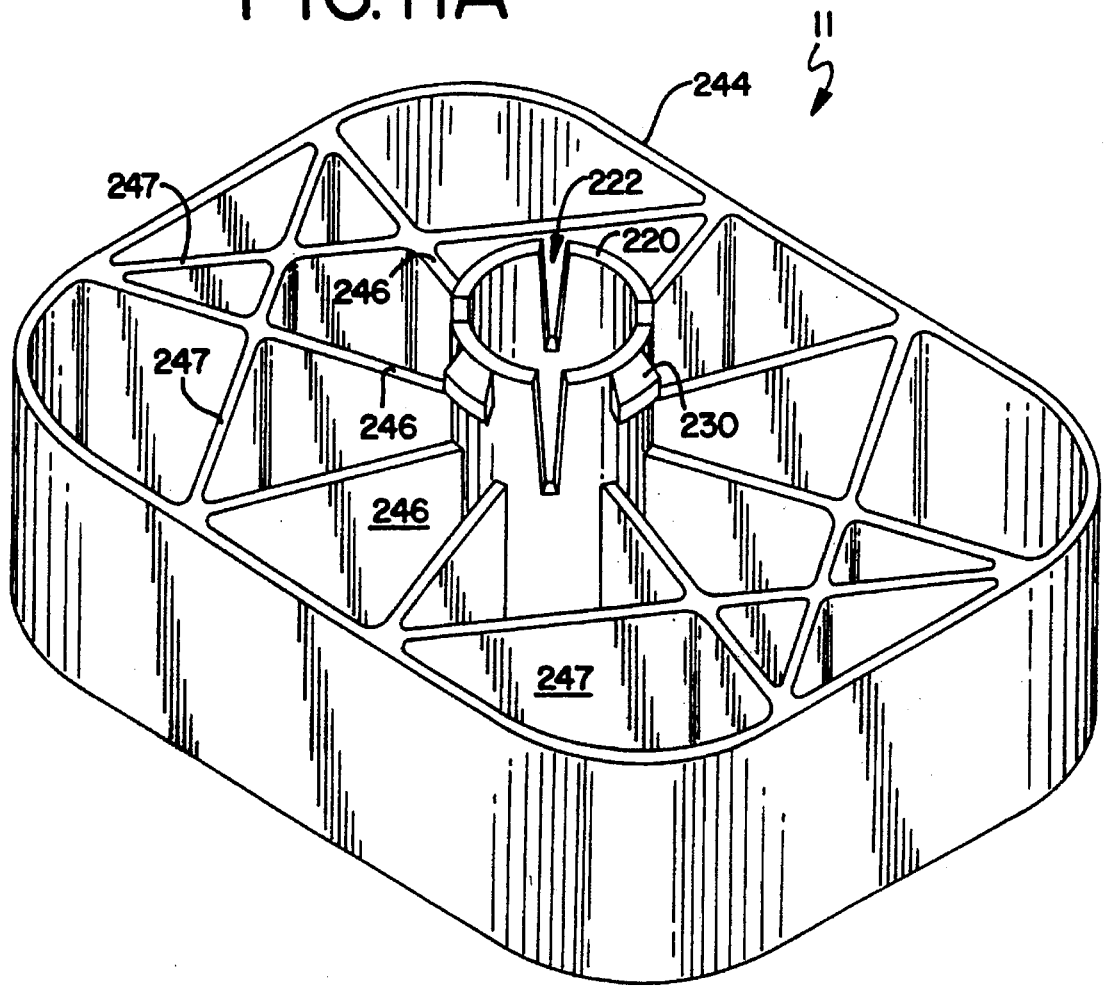
FIG. 11A is a perspective top view of an alternative separate connector for use with the pallet of FIGS. 1–10.

Other spoke 246, 247 configurations are possible. For example, FIG. 11A shows a connector 11 with a different transverse spoke 247.

The upper and lower edges of the spokes 246, 247 and the sleeve 244 define planes P (FIG. 15) which extend perpendicular to the axis of the core 220.

The openings 17 in the base 20 and the deck 100 are adapted to receive the tangs 224, 226. Each opening 17 is surrounded by an abutment 61, 161 recessed below the adjacent surface of the deck or the base. The abutment 61, 161 is sized such that the distance between the plane P and the flat lower surface 232 of the barb 230 allows the barbs to snap into position (See FIG. 8).

To assemble the pallet 10, the connectors 11 are first assembled to a first piece, either the base 20 or the deck 100, by aligning a set of tangs 224, 226 with the opening 17 and then applying an axial force which causes the ramps 234 of the barbs 230 to deflect the tang inwardly sufficient to allow the set of tangs to pass through the openings. After the barb 230 has cleared the abutment surface 61, 161, the memory characteristics of the plastic will snap the tangs back to their original condition and lock the connector to the base or deck. After all the connectors are assembled on the base or deck, the other piece, i.e., deck or base, is positioned above or below the piece with the connectors and the openings therein are aligned. A force applied to the outer surface of the second piece will similarly snap the connectors to the second piece.

E. The Integral Internal Connectors

The details of the integral internal connectors of the base and the deck are shown in FIGS. 16–20. There are six (6) integral connectors (FIG. 1). The six integral connectors 11a are positioned on the base 20 of the embodiment shown in two parallel rows with one (1) at each of the junctions where the second cross member 34a and the third cross member 34b meets each of the side members 31 and one (1) each at the junction of where the first cross member 33 meets the second cross member 34a and the third cross member 34b. The six integral connectors 11a are positioned on the deck 100 (FIG. 7) of the embodiment shown in two parallel rows between and parallel the two ends 125, 126, four (4) adjacent the sides 123, 124 (two sets—one set per side) and two disposed between each set.

The integral connectors comprise a mating system. The system of the base cooperates with the system of the deck. Specifically, the system of the base 20 (FIGS. 4, 8, 16 and 17) includes a hollow central circular core 320 which has circumferentially spaced slots 322 extending from the distal end thereof which produce a set of tangs 328. Each tang 328 is identical in construction and has a barb 330 formed adjacent the distal end thereof. Each barb 330 has a flat lower surface 332 which extends perpendicular to the axis of the core 320 and has a tapered outer surface 334 extending from the outer edge to define a ramp.

In the embodiment shown, four tangs 228 are shown with each tang spanning approximately ninety degrees.

The central core 220 is attached by crossing integral spokes or webs 321 via a cylindrical web 323 to the main body of the base 20.

And, the system of the deck 100 (FIGS. 7, 8, 18 and 19) includes a protective force absorbing oval sleeve 330 with inwardly projecting webs or spokes 331 and an internal, central receiving core 332. The central receiving core 332 has an opening 333 at the distal end thereof. As with the openings 117 for the separate connectors, there are means for receiving and seating the barbs of the integral connectors 11a. In particular, adjacent the outer surface 122 of the deck 100, there are circular, outer recessed abutments 361 which are recessed below the plain of the adjacent outer surface 122 of the base. The recessed abutments are formed by and between a substantially vertical first annular wall, the central receiving core 322, and a substantially vertical second annular wall 365. The outer recessed abutments 361 are generally circular. The recessed abutment 361 sitting below the adjacent outer surface 122 of the deck is sized so it is greater than or equal to the distance between the flat lower surface 332 of the barb 330 and the outermost point of the taper or ramp 334. This allows the barbs to snap into position and sit below the outer surface 122 of the deck. (See FIG. 8). In addition, tabs 335 are formed at the distal end of the central receiving core to guide the tangs therein. The central receiving core 332 with the opening 333 at the distal end thereof is sized so as to receive the central core 320 with tangs 328 of the base 20. To assemble the pallet 10, the integral connectors 11a are aligned such that the central cores 320 of the base 20 face the receiving cores 332 of the deck 100. An axial force is applied to the connectors 11a which causes the ramps 334 of the barbs 330 to deflect the tangs inwardly sufficient to allow the tangs to pass through and within the opening 333 of the receiving core 332. After the barbs 330 have cleared the abutment surface 361, the memory characteristics of the plastic will snap the tangs back to their original condition and lock the connector together. This can be done simultaneously with the attachment of the separate connectors 11.

The two centrally located internal, integrated connectors 11a (FIG. 7) on the deck 100 also have projecting barbs 350. As shown in the cross-section of FIG. 20, at opposed sides on the oval sleeve 330 a projecting post 354 is formed which supports the barb. Each barb 350 has at its distal end a flat lower surface 352 and ramp or taper 353. As seen in FIG. 7, these centrally located connectors are larger in size and include additional internal transverse support ribs 351. In addition, support webs 355 assist in reinforcing the posts 354. These projecting barbs 350 of the posts 354 cooperate with small holes, designated 370 (shown in FIGS. 4 and 5), formed into the base 20. The holes 370 receive the post 354 and ramp section 353 of the barbs 350 and slide into a snap fit relationship with the application of an axial force. This additional locking mechanism is for added safety. If for any reason other connectors were to fail, the additional posts 354 and barbs 350 act to keep the components together.

The two primary pallet components, namely the base and the deck, are preferably injection molded from recycled material, such as polypropylene or similar thermoplastic material. Additionally, a pigment may be added to provide color combinations to suit the customer's needs.

Of course, the size, shape and the number of separate and integral internal connectors can be varied without departing from the spirit of the invention.

It will be appreciated that the simplicity of the plastic pallet reduces the inventory substantially since only two primary components are necessary. Also, since the base or deck only require recessed shoulders formed in wells, the molds for producing the large decks are greatly simplified to reduce production costs.

The intricate design of the connectors has several distinct advantages. The design is such that all external forces are transmitted to the center of the core, which will withstand the greatest force without destruction. Furthermore, the connectors are configured so they can be formed as one piece in a single stage mold to reduce the cost. Since the connectors and the decks are preferably injection molded from recycled plastic, the costs are further reduced.

Another significant advantage of the plastic pallet is that the connectors can easily be separated should one of the connectors become damaged. This can be accomplished by the owner without return of the pallet assembly to the manufacturer.

Removal of connectors or the separation of components can be accomplished very easily with the aid of a simple tool, such as the one shown and claimed in the patent by the same inventors of the present invention, U.S. Pat. No. 4,843,976 for a PLASTIC PALLET, which is incorporated herein by reference.

While the specific embodiments have been illustrated and described, numerous modifications come to mind without significantly departing from the spirit of the invention and the scope of protection is only limited by the scope of the accompanying Claims.

We claim:

1. A pallet base for use in combination with a second pallet base or a pallet deck and a plurality of separate connectors, the pallet base having an inner surface and an outer surface and being interconnected to the second pallet base or deck by the separate connectors, the pallet base comprising:

a pair of substantially parallel side members and a pair of substantially parallel end members that are substantially perpendicular to the side members;

a first cross member disposed between and connected to the end members and a second cross member disposed between and connected to the side members;

the inner surface having a plurality of spaced-apart transverse inner ribs projecting therefrom; and, the opposed outer surface having a plurality of spaced apart transverse outer ribs projecting therefrom, the side members, the end members and the cross members being generally U-shaped in cross-section.

2. The pallet base as defined in claim 1 wherein the side members, the end members and the cross members include a substantially horizontal second portion having two sides with a ramp portion and a substantially horizontal first portion integral with each of the two sides of the horizontal second portion, the outer surface of the ramp portions and the horizontal second portion being concave.

3. The pallet base as defined in claim 1 wherein the base further includes a plurality of openings therein for receiving the separate connectors and integral, internal connectors for cooperating with the connected second pallet base or pallet deck.

4. The pallet base as defined in claim 3 wherein the integral, internal connectors include a hollow central circular core having circumferentially spaced slots extending from the distal end thereof producing a set of tangs.

5. The pallet base as defined in claim 4 wherein each tang of the integral, internal connectors has a barb formed adjacent the distal end thereof and has a flat lower surface extending perpendicular to an axis of the hollow core and a tapered outer surface extending from an outer edge to define a ramp.

6. The pallet base as defined in claim 5 wherein the central core of the integral, internal connectors includes four tangs, each tang spanning approximately ninety degrees, and is attached to the base by crossing integral webs.

7. A generally rectangular pallet deck for use in combination with a second pallet deck or a pallet base and a plurality of separate connectors, the pallet deck having a first side, an opposed second side, a first end and an opposed second end and being interconnected to the second pallet deck or base by the separate connectors, the pallet deck further comprising:

a substantially planar outer surface with perimeter reinforcement means;

an inner surface with a reinforcement structure projecting outwardly therefrom;

openings for receiving the separate connectors; and, a plurality of integral, internal connectors for cooperating with the connected second pallet deck or pallet base, the internal connectors further including a protective force absorbing oval sleeve with inwardly projecting webs and an internal, central receiving core, the core including an opening at the distal end thereof.

8. The pallet deck as defined in claim 7 wherein the internal connectors further include means for receiving and seating barbs attached to the connected second pallet deck or pallet deck.

9. The pallet deck as defined in claim 8 wherein the means for receiving and seating barbs includes circular, outer recessed abutments recessed below the plain of the outer surface formed by a substantially vertical first annular wall, the central receiving core, and a substantially vertical second annular wall.

10. The pallet deck as defined in claim 9 wherein the central receiving core further includes tabs formed at the distal end to act as guides.

11. A plastic pallet having a generally rectangular pallet base, a generally rectangular pallet deck, and a plurality of connectors interconnecting the base and the deck, the pallet base including a pair of substantially parallel side members, a pair of substantially parallel end members that are substantially perpendicular to the side members and connected to the side members, at least one cross member disposed between and connected to one of either the side members or the end members, an inner surface with inner reinforcement elements projecting therefrom and, an opposed outer surface, and the pallet deck including a first side, an opposed second side, a first end and an opposed second end, a substantially planar outer surface with perimeter reinforcement means, and an inner surface inner reinforcement elements projecting therefrom, comprising:

at least one internal connector having a first element integral with the inner surface of the base cooperating with a second element integral with the inner surface of the deck; and, at least four separate connectors, each positioned at a corner of the pallet and disposed between the base and the deck and further cooperating with openings in each of the deck and the base.

12. The plastic pallet as defined in claim 11 wherein the first element includes a central core with projections thereon and the second element includes a sleeve with inwardly projecting spokes and an internal, central receiving core having an opening at the distal end thereof adapted to receive the central core of the first element and means for receiving and seating the projections of the first element.

13. The plastic pallet as defined in claim 12 wherein the projections of the first element are formed by circumferentially spaced slots extending from the distal end of the first element which produce a set of tangs and each tang has a barb formed adjacent the distal end thereof and the receiving core of the second element has an opening at the distal end thereof to receive the central core with tangs.

14. The plastic pallet as defined in claim 13 wherein each barb has a flat lower surface which extends perpendicular to the axis of the core and has a tapered outer surface extending from the outer edge to define a ramp.

15. The plastic pallet as defined in claim 14 wherein the second element further includes at opposed sides on the sleeve a projecting post with a barb thereon for cooperating with the first element.

16. A connector for use in interconnecting two members to form a pallet, comprising:

a central hollow core member having slots extending from opposite ends to produce a plurality of flexible tangs at opposite ends of the core member, a plurality of radial spokes extending from the periphery of the core member between the tangs, a non-circular sleeve surrounding the core member and being integral with outer ends of the spokes, and an inwardly-directed integral force-absorbing flange between the tangs.

17. The connector as defined in claim 16 wherein the sleeve is rectangular.

18. The connector as defined in claim 17 wherein the radially spaced spokes are spaced between approximately 30 and 60 degrees apart.

19. The connector as defined in claim 18 further including a plurality of transverse spokes integral with at least two radial spokes.

20. The connector as defined in claim 19 wherein the hollow core member is circular and the slots terminate in close proximity to planes defined by the spokes.

21. The connector as defined in claim 20 wherein each of the tangs has a barb formed adjacent a free edge thereof, each barb having a lower flat edge extending perpendicular to the axis of the hollow core member.

22. The connector as defined in claim 21 wherein each tang spans approximately ninety degrees, the tangs at each opposed end are circumferentially offset from the tangs at the other opposed end.

* * * * *